Figure 1:
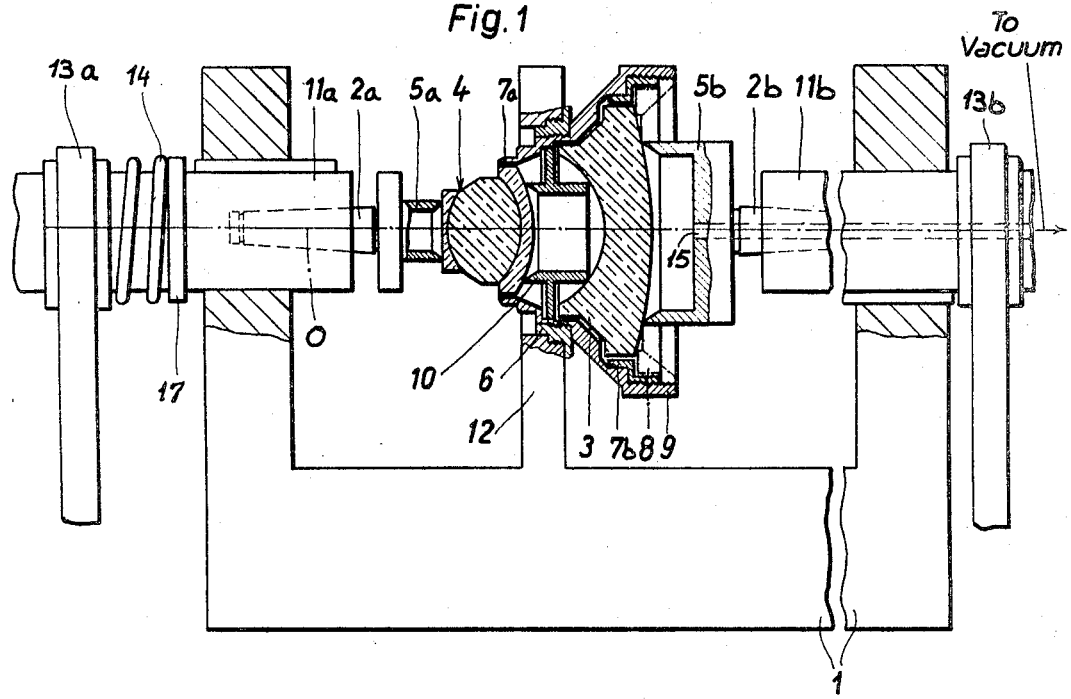

Franz Werner
Inventor.

United States Patent Office 3,466,728
Patented Sept. 16, 1969

3,466,728
APPARATUS OR MACHINE FOR MOUNTING AN OPTICAL COMPONENT ON A HOLDER THEREFOR
Franz Werner, Munster-Sarmsheim, Germany, assignor to Jos. Schneider & Co., a corporation of Germany
Filed Mar. 21, 1966, Ser. No. 536,126
Claims priority, application Germany, Apr. 15, 1965, Sch 36,893
Int. Cl. B23p *19/00;* G02b *7/02;* G02c *13/00*
U.S. Cl. 29—200                                5 Claims The present invention relates to a component of an optical objective, such as a lens or combination of lenses, which has a circular outline and is to be mounted with great precision in an annular holder therefor.

Prior systems for securing such components to their holders have been cumbersome and slow, especially when several components had to be properly aligned in a common holder. Frequently, a special machining of the lens and holder peripheries was necessary to insure the desired coaxial relationship of the parts in their assembled condition.

The general object of this invention is to provide an improved apparatus or machine, suitable for use in series production, for mounting such lenses and/or lens combinations on their holders, along with the provision of a simple device for carrying out the method.

In accordance with an aspect of the present invention, the holder and the component to be secured thereto are mounted in nested and substantially coaxial relationship but with maintenance of an annular clearance between the outer periphery of the component and the inner periphery of the holder, followed by introduction of a hardenable cement between these peripheries with occupation of the entire clearance by the cement which is allowed to harden after the component has been centered on the holder with rotation thereof about their common axis. The resulting product is a lens mount in which the annular clearance between the inner holder periphery and the outer lens periphery is occupied by a hardened cement which securely joins the parts to each other and maintains their established coaxial position.

In accordance with another aspect of the invention, there is provided an apparatus having rotatable first and second support means for the component and its holder, respectively, and means for jointly rotating both support means about their common axis, there being further provided biasing means axially urging the two support means toward each other while permitting their axial separation against the biasing force.

With an apparatus, machine or device so constructed it is possible, pursuant to a preferred embodiment of the invention, to center the component in the holder before applying the cement thereto, advantageously by axially urging the component against a coaxial centering ring supported on the holder, whereupon the centered components may be axially separated from the holder to a sufficient extent to expose their respective peripheries so that the adhesive may be applied to either or both these peripheries in the quantity necessary to fill the intervening clearance upon a subsequent return of the parts to their nested and centered position.

The use of a centering ring is particularly advantageous when two lens and/or lens combinations are to be cemented onto opposite sides of a common holder. In this case the centering ring will be sandwiched between the two components, preferably so as to bear upon curved (concave or convex) confronting faces thereof, either with or without previous cementing of one of the components to the holder. If neither component has been cemented, both may be withdrawn sequentially or concurrently and in opposite axial directions preparatorily to the application of the adhesive; if one component had already been cemented, the other may be so withdrawn. In each case it is readily possible to remove the centering ring before final assembly if the presence of such ring were objectionable in the finished objective.

According to another advantageous feature, the axial withdrawal of a centered component is effected by suction. For this purpose the apparatus may be equipped with one or two spindles terminating in lens-engaging chucks which are formed with channels connectable to a source of low pressure for retaining a respective component on the chuck during its separation from the holder.

The adhesive substance used for cementing the lenses onto their holders is preferably of the cold-setting type and ought to be free from volatile solvents in order to avoid the formation of blisters. A suitable resin of this type has a cyanoacrylate-base polymer, especially one which is curable by anionic catalysts. A one-component resin in this class is commercially available under the name "Acrylon" and consists of a copolymer of acrylic-acid ester and acrylonitrile.

Figure 2:
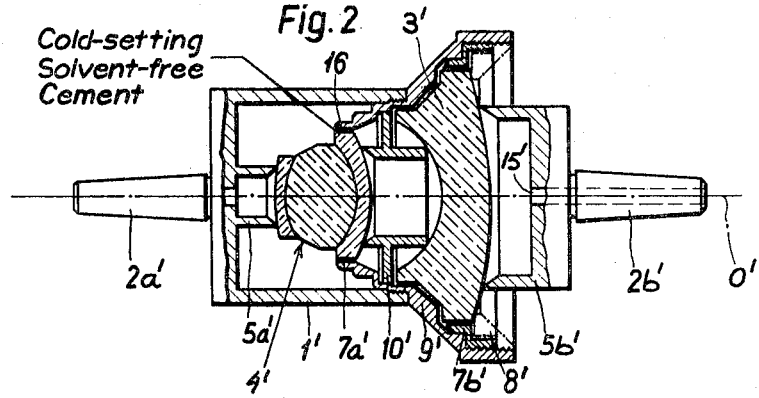

The invention will be described in greater detail with reference to the accompanying drawing in which:

FIG. 1 is a side view, partly in section, of an apparatus for carrying out the aforedescribed process; and FIG. 2 is a similar view illustrating a modified apparatus.

The device shown in FIG. 1 comprises a frame 1 having a pair of shafts 11a, 11b slidably but non-rotatably mounted thereon. Shafts 11a and 11b are rotatably journaled in respective bearings 13a, 13b and carry the shanks 2a, 2b of two generally cup-shaped chucks 5a, 5b. A compression spring 14, exerting an axial thrust upon a collar 17 of shaft 11a, urges the chuck 5a into firm contact with a lens combination 4 (here shown as a triplet). The convex opposite surface of this optical component bears upon a centering ring 10 which in turn engages a confronting concave face of a lens 3 (here shown as a negative meniscus). Chuck 5b limits the axial displacement of the assembly 3, 4, 10 by engaging the convex outer surface of lens 3, the ring 10 being freely slidable in axial direction within an annular lens holder 9.

A flange 7a on lens holder 9 surrounds with annular clearance the largest periphery of the lens combination 4 while an annular insert 7b, screwed into the holder 9 and firmly connected thereto, similarly surrounds part of the periphery of lens 3. Lens holder 9 is firmly but removably secured, through the intermediary of an internally and externally threaded mounting ring 6, in an arm 12 on frame 1.

As particularly illustrated for the chuck 5b, the interior of each chuck communicates with a suction channel 15 leading through the associated shaft to a source of vacuum not shown. The application of reduced pressure to this channel thus enables the chuck to grip the engaged lens so as to hold it against swiveling or rotation while the chuck is actually withdrawn from the holder 9 on arm 12.

In operation, components 3 and 4 are mounted under pressure from spring 14, but otherwise freely movable, within the firmly supported holder 6. Shafts 11a, 11b are then turned manually or automatically, together with frame 1, to rotate the entire assembly about its axis O so that the necessary adjustment can be made in the position of lenses 3 and 4. Thereafter, suction is applied to the chucks 5a, 5b and the two shafts 11a, 11b are axially withdrawn, together with their chucks 5a, and 5b, to an extent sufficient to expose the peripheries of lenses 3 and 4 which previously had been surrounded by the rings 7b and 7a, respectively. At this stage it will also be possible to remove the centering ring 10 after a sufficient separation of lens 3 from holder 9.

Next, a cement as described above (and as illustrated at 16 in FIG. 2) is applied to those exposed peripheries (including those peripheral portions of lens 3 which directly confront the holder 9) whereupon the axial motion of the shafts is reversed and the assembly, minus its ring 10, is restored to its previous position. The cement is then allowed to harden. Finally, a clamping ring 8 may be screwed into the layer end of holder may then be unscrewed from the frame 1 and the entire lens mount can be removed after at least the shaft 11b has been retracted to a sufficient extent, the suction at the chucks 5a and 5b being of course cut off at this time.

The modified arrangement of FIG. 2, in which primed numerals designate elements similar to previously identified constituents, may be used in substantially the same manner, except that in this instance the component 4' is to be cemented to flange 7a' of holder 9' before the lens 3' is introduced into the other end of that holder. The chuck 5a' is here integral with a housing 1' which surrounds the components 4' and supports the holder 9' together with its removable centering ring 10'. After the holder 9' has been screwed into the housing 1', the lens combination 4' with its cement coating 16 is brought into contact with the chuck 5a' onto which it may again be held by suction. Component 4' is centered while the adhesive 16 is still soft; the cement is then allowed to harden, whereupon ring 10' and lens 9' are placed in the position shown and axial pressure is applied as in the preceding embodiment. The assembly is again rotated about axis O' to enable centering of lens 3'. Thereafter, chuck 5b' and spindle 2b' together with their supporting shafts (not shown) are axially withdrawn while vacuum is applied to channel 15' so that lens 3' is held steady while being entrained out of the holder 9'. Ring 10' can now be removed and, after a coating of the periphery of lens 3' with adhesive, this lens is returned to its assembled position. Upon final hardening, a retaining ring 8' may again be screwed into the holder 9'.

It will be noted that the arrangements described and illustrated enable full visual inspection of the lenses to be centered. Naturally, the system herein disclosed may be modified in various ways without departing from the spirit and scope of the invention as defined in the appended claims.

I claim:
1. An apparatus for mounting at least one circular component of an optical objective on an annular holder therefor, comprising:
   rotatable first support means for said component;
   rotatable second support means for said holder coaxial with said first support means;
   means for jointly rotating both said support means about their common axis;
   and biasing means axially urging said first and second support means toward each other, said first and second support means being axially separable against the force of said biasing means.

2. An apparatus as defined in claim 1 wherein said first support means comprises a chuck having a channel connected to a source of low presure for retaining said component on said chuck by suction during separation of said first and second support means.

3. An apparatus as defined in claim 1, further comprising a centering ring carried by said second support means for axial engagement by said component under pressure from said biasing means.

4. An apparatus as defined in claim 1 wherein said first support means comprises a pair of coaxial spindles disposed on opposite sides of said second support means, said spindles being provided with chucks for engagement with respective components to be introduced into said holder from opposite sides.

5. An apparatus as defined in claim 4, further comprising a centering ring removably carried on second support means through the intermediary of said holder for concurrent engagement with confronting surfaces of both said components.

References Cited
UNITED STATES PATENTS

| | | | |
|---|---|---|---|
| 2,277,613 | 3/1942 | Swenson | 29—406 |
| 2,680,287 | 6/1954 | Wilson. | |
| 2,765,523 | 10/1956 | Vaughan | 29—406 |

THOMAS H. EAGER, Primary Examiner

U.S. Cl. X.R.
29—406; 350—178, 252